United States Patent [19]

Kiuchi

[11] Patent Number: 5,129,094
[45] Date of Patent: Jul. 7, 1992

[54] MICROCOMPUTER SIGNAL PROCESSOR HAVING FIRST AND SECOND CIRCUITRY TO CONTROL TIMING OF INSTRUCTION AND DATA MEMORY ACCESS

[75] Inventor: Toyoo Kiuchi, Tokyo, Japan
[73] Assignee: NEC Corporation, Tokyo, Japan
[21] Appl. No.: 393,347
[22] Filed: Aug. 14, 1989
[30] Foreign Application Priority Data Aug. 12, 1988 [JP] Japan .................. 63-201226

[51] Int. Cl.⁵ .................................. G06F 9/38
[52] U.S. Cl. .................... 395/800; 364/259.9; 364/260.8; 364/238.6; 364/238.9; 364/DIG. 1
[58] Field of Search ..................... 395/800; 364/200 MS File, 900 MS File

[56] References Cited

U.S. PATENT DOCUMENTS

| | | | |
|---|---|---|---|
| 3,771,138 | 11/1973 | Celtruda et al. | 364/200 |
| 4,344,129 | 8/1982 | Asada et al. | 364/200 |
| 4,398,245 | 8/1983 | Fujita | 364/200 |
| 4,958,275 | 9/1990 | Yokouchi | 364/200 |

Primary Examiner—Thomas C. Lee
Assistant Examiner—William M. Treat
Attorney, Agent, or Firm—Sughrue, Mion, Zinn, Macpeak & Seas

[57] ABSTRACT

A microcomputer comprises an instruction buffer receiving an instruction, a first decoder for decoding the instruction outputted from instruction buffer so as to generate a write request detection signal, an instruction memory for receiving and storing the instruction outputted from instruction buffer, a program counter for indicating an address to be written or read, a second instruction decoder for receiving an instruction code read from the instruction memory and for generating data and control signals including a halt signal, a data memory for storing the data from the second instruction decoder in response to a write signal from the second instruction decoder and for outputting data stored in the data memory in response to a read signal from the second instruction decoder, an address counter for receiving an address information from the second instruction decoder and for supplying an address to the data memory, a logic circuit connected to receive through a gate the halt signal from the second instruction decoder and for generating a halt indication signal to the program counter so as to inhibit an updating of the program counter, the logic circuit being also connected to receive the write request detection signal from the first instruction decoder and the write request decode signal from the second instruction decoder so that the halt signal is prevented from being inputted through the gate when the write request detection signal and the write request decode signal are in a predetermined condition, and a pulse input circuit for receiving a clock pulse for defining a periodical operation and for outputting the clock pulse to the program counter.

2 Claims, 5 Drawing Sheets

| ADDRESS | INSTRUCTION RAM |
|---|---|
| 0 | WCA |
| 1 | WC |
| 2 | WCA |
| 3 | WC |
| ⋮ | ⋮ |
| 88 | WCA |
| 89 | WC |
| 90 | HALT |
| ⋮ | |
| 179 | |

FIGURE 3

| ADDRESS | INSTRUCTION RAM |
|---|---|
| 0 | |
| 1 | |
| 2 | MULTIPLICATION / ADDITION OPERATION PROGRAM |
| 3 | |
| ⋮ | |
| 139 | |
| 140 | WOK |
| 141 | HALT |
| ⋮ | |
| 179 | |

FIGURE 4

ADDRESS

| Address | Content |
|---|---|
| 0 | |
| 1 | |
| 2 | MULTIPLICATION |
| 3 | / ADDITION |
| ⋮ | OPERATION PROGRAM |
| 139 | |
| 140 | WOK |
| 141 | HALT |
| 142 | WCA |
| 143 | WC |
| 144 | WCA |
| 145 | WC |
| ⋮ | |
| 174 | WCA |
| 175 | WC |
| 176 | WRQ |
| ⋮ | |
| 179 | |

| ADDRESS | INSTRUCTION RAM |
|---|---|
| 0 | |
| 1 | |
| 2 | MULTIPLICATION |
| 3 | / ADDITION OPERATION PROGRAM |
| ⋮ | |
| 139 | |
| 140 | WOK |
| 141 | HALT |
| 142 | WCA |
| 143 | WCINC |
| 144 | WCINC |
| ⋮ | ⋮ |
| 168 | WCINC |
| 169 | WC |
| 170 | WRQ |
| ⋮ | |
| 179 | |

MICROCOMPUTER SIGNAL PROCESSOR HAVING FIRST AND SECOND CIRCUITRY TO CONTROL TIMING OF INSTRUCTION AND DATA MEMORY ACCESS

BACKGROUND OF THE INVENTION

1. Field of the Invention

The present invention relates to a microcomputer, and more specifically to a microcomputer which processes periodically inputted data.

2. Description of Related Art

Hitherto, a typical example of microcomputers which process periodically inputted data has been a so-called digital signal processor. Conventional digital signal processors, particularly, audio digital signal processors, have been configured to receive a digital signal obtained by digitizing an audio signal by a predetermined sampling frequency ($f_s$) and to perform a multiplication and addition operation for the received digital signal in order to filter the received digital signal.

In an ordinary practice, the filtering due to the multiplication and addition operation is repeated at a constant sampling period $1/f_s$, and therefore, a time required for execution of the multiplication and addition operation must be less than the sampling period $1/f_s$. For example, in a digital signal processor for a audio signal digitized at a sampling frequency $f_s$ of 44.1 KHz, a filtering operation is executed with a time not larger than the sampling period $1/f_s$ of 22.7 μs, and repeated at an interval of 22.7 μs.

In the above mentioned digital signal processors, there is a demand of modifying a processing mode of the filtering operation without interrupting or discontinuing of the filtering operation. For example, in the audio purpose digital signal processor used in audio instruments, tone can be adjusted by modifying the characteristics of the filtering acted on the audio signal. This modification of the filtering characteristics can be attained by modifying coefficients of the multiplications and additions for realizing the filtering processing. For this purpose, the conventional digital signal processors have two memories for storing the coefficients of the multiplications and additions, so that when the multiplications and additions are executed by using the coefficients stored in one of the two memories, it is possible to rewrite the coefficients stored in the other memory.

For example, in an audio purpose digital signal processor having a first coefficient memory and a second coefficient memory, when the filtering operation is being executed by using the first coefficient memory, a content of the second coefficient memory is rewritten, and after the rewriting of the second coefficient memory has been completed, the second coefficient memory is put in a condition accessed for the filtering operation, in place of the first coefficient memory, so that it becomes possible to rewrite the first coefficient memory. Thereafter, if it becomes necessary to modify the coefficients for the filtering, again, when the filtering operation is being executed by using the second coefficient memory, the first coefficient memory is rewritten. After the rewriting of the first coefficient memory has been completed, the memory accessed for the filtering operation is switched from the second coefficient memory to the first coefficient memory, so that the first coefficient memory is accessed for the filtering operation.

Here, the switching between the first and second coefficient memories is performed at a timing within a time period from the completion of one filtering operation repeated at the sampling interval $f_s$ before a start of a next filtering operation. If the switching of the coefficient memories is attained at the above timing, the coefficients for the filtering can be modified without interrupting or discontinuing the filtering processing. In other words, the tone can be adjusted without chopping or breaking the sound.

However, the audio purpose digital signal processor having two coefficient memories consequently requires a large memory capacity. In general, since the digital signal processor is required to access the coefficient memory at a very high speed, an execution unit for the multiplication and addition and the coefficient memories are needed to be assembled on the same LSI chip. In addition, the rewritable coefficient memories must be formed of a random access memory (RAM) which ordinarily needs a chip area ten times that of a read only memory (ROM). As a result, the conventional digital signal processor has been required to include, in the LSI chip, a RAM having a capacity larger than the memory capacity required and sufficient for storing the coefficients for the filtering operation. Accordingly, the ratio of the RAM area to the chip area has gradually increased with years, and the chip area itself gradually increased. However, the increase of the chip area will result in increase of the cost and in decrease of yield.

SUMMARY OF THE INVENTION

Accordingly, it is an object of the present invention to provide a microcomputer which has overcome the above mentioned defect of the conventional one.

Another object of the present invention is to provide a digital signal processor having a coefficient rewritable memory which requires only a memory capacity for storing the required amount of coefficients.

The above and other objects of the present invention are achieved in accordance with the present invention by a microcomputer comprising an instruction buffer receiving an instruction, a first decoder coupled to the instruction buffer for decoding the instruction outputted from instruction buffer so as to generate a write request detection signal, an instruction memory coupled to the instruction buffer for receiving and storing the instruction outputted from instruction buffer, a program counter coupled to the instruction memory for indicating an address to be written or read, the program counter being also coupled to the instruction buffer for receiving an address information from the instruction buffer and being incremented in response to an increment pulse, a second instruction decoder coupled to the instruction memory for receiving an instruction code read from the instruction memory and for generating data and control signals including a halt signal and a write request decode signal, a data memory coupled to the second instruction decoder for storing the data from the second instruction decoder in response to a write signal from the second instruction decoder and for outputting data stored in the data memory in response to a read signal from the second instruction decoder, an address counter coupled to the second instruction decoder for receiving an address information from the second instruction decoder, a first set-reset circuit having a set input connected to receive through a gate the write request decode signal from the second instruction decoder and the halt signal from the second instruction decoder and for generating a halt indication signal to the program counter so as to inhibit an updating of the program counter, a second set-reset circuit having a set input connected to receive the write request detection signal from the first instruction decoder and a reset input connected to receive the write request decode signal from the second instruction decoder, the second set-reset circuit having an output connected to the gate so as to prevent the halt signal from being inputted through the gate to the first set-reset circuit when the second set-reset circuit is in a set condition, and a pulse input circuit for receiving a clock pulse for defining a periodical operation and for outputting the clock pulse to the program counter and the first set-reset circuit as a reset signal.

The above and other objects, features and advantages of the present invention will be apparent from the following description of preferred embodiments of the invention with reference to the accompanying drawings.

DESCRIPTION OF THE PREFERRED EMBODIMENTS

Figure 1:
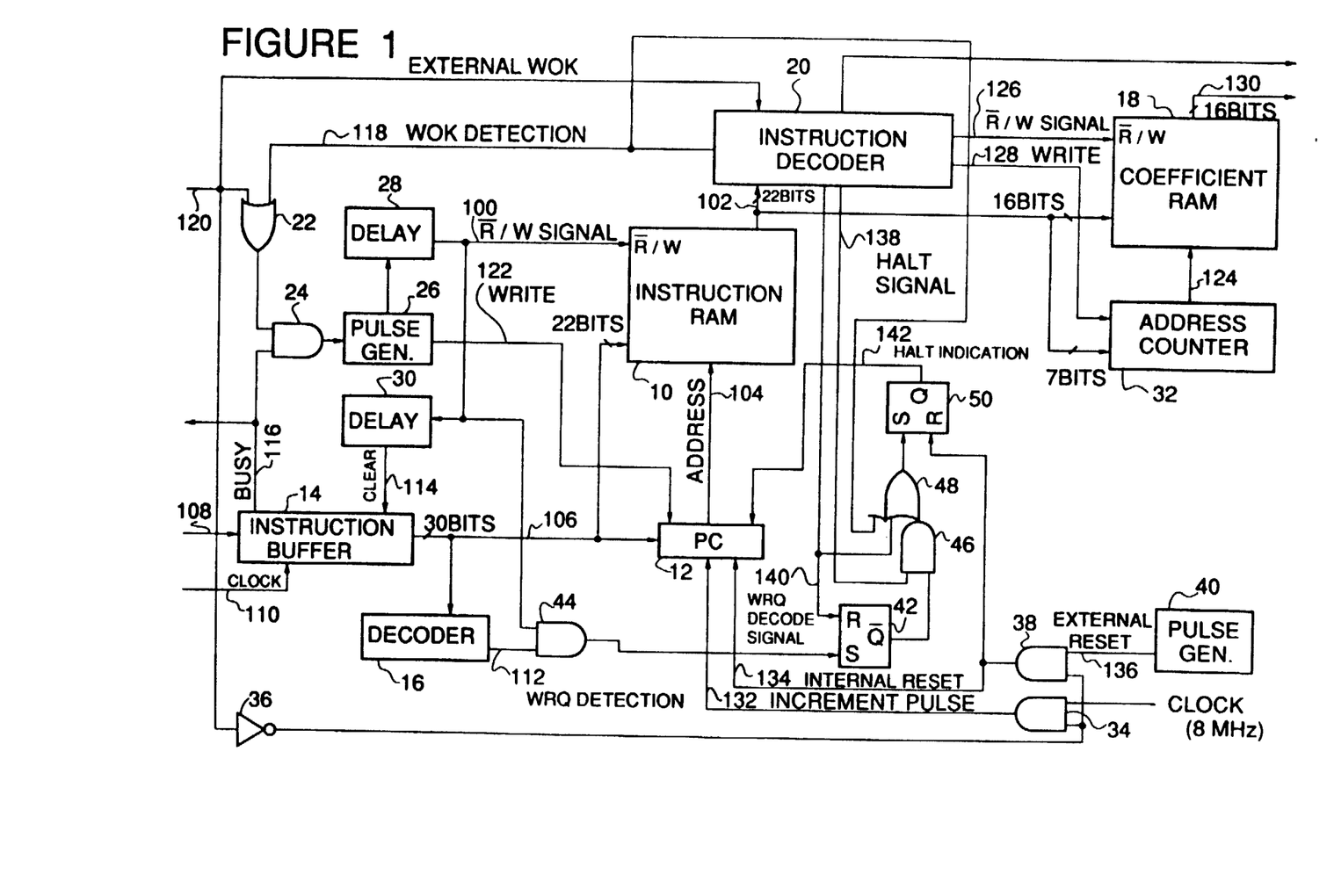
FIG. 1 is a block diagram of one embodiment of the microcomputer in accordance with the present invention.

Referring to FIG. 1, there is shown a block diagram of one embodiment of the microcomputer in accordance with the present invention. The shown microcomputer includes an instruction RAM (random access memory) 10 of 22 bits × 180 words connected to receive a reas/write signal ($\overline{R/W}$ signal 100. If the ($\overline{RW}$ signal 100 is at a low level, a 22-bit instruction code is outputted to an 22-bit bus 102 from an address of the instruction RAM 10 designated through a bus 104 by a program counter (PC) 12. On the other hand, when the ($\overline{R/W}$ signal 100 is at a high level, a lower place 22 bits of a 30-bit bus 106 is fetched and written to an address of the instruction RAM 10 designated by the program counter 12. The 30-bit bus 106 is connected to a parallel output of an instruction buffer 14, which has a serial input connected to a serial data line 108 and also connected to a clock line 110. Therefore, the instruction buffer 14 operates to receive and fetch an address and an instruction code transferred on the serial data line 108, in synchronism with a clock pulse on the clock line 110, and to convert the serial data into a parallel data which is outputted onto the 30-bit bus 106. A higher place 8 bits of the 30-bit bus 106 form an address information, and as mentioned above, the lower place 22 bits of the 30-bit bus 106 form an instruction code to be written to the instruction RAM 10.

A decoder 16 is connected to receive and decode the instruction code on the 30-bit bus 106. If the decoder 16 detects an instruction code for a rewrite request of a coefficient RAM (random access memory) 18 explained hereinafter, the decoder 16 brings a rewrite request detection signal 112 to a high level. Here, the instruction for the rewrite request will be called a "WRQ instruction" and the rewrite request detection signal will be called a "WRQ detection signal". In addition, the instruction buffer 14 is cleared in response to a pulse signal outputted on a clear signal line 114, and at the same time, brings a busy signal BUSY 116 to a low level. Thereafter, the instruction buffer operates to accumulate data on the serial data line 108 in response to each clock pulse, and then brings a busy signal BUSY 116 to a high level when thirty clock pulses have been inputted after the clear signal 114 was applied, namely, when active data of 30 bits is stored in the instruction buffer 14.

An instruction decoder 20 is connected to receive the instruction code on the 22-bit bus 102 and to decode the receive instruction code for generate various control signals. When the instruction decoder 20 detects on the 22-bit bus 102 an instruction code allowing the writing of an instruction code to the instruction RAM 10 (this instruction will be called a "WOK instruction"), the instruction decoder 20 brings a WOK detection signal 118 to a high level. This WOK signal 118 is applied to an one input of an OR gate 22, which has the other input connected to receive an external WOK signal 120 setting a mode for forcibly writing an instruction code to the instruction RAM 10. This external WOK signal 120 is also inputted to the instruction decoder 20. An output of the OR gate 24 is connected to one input of a two-input AND gate 24, whose other input is connected to receive the BUSY signal 116. Therefore, when either the WOK detection signal 118 or the external WOK signal 120 is at a high level, and when the BUSY signal 116 is at a high level which means that an effective address of 8 bits and an effective instruction code of 22 bits are transferred to and accumulated in the instruction buffer 14, the AND gate 24 generates a high level output signal to a pulse generator 26, which also outputs a write pulse through an instruction RAM write signal line 122 to the program counter 12. In response to the write pulse on the line 122, the program counter 12 fetches the 8-bit address on the higher place 8 bits of the bus 106, and the newly fetched address is immediately outputted to the instruction RAM 10 through the bus 102.

The write pulse of the pulse generator 26 is also supplied to a delay circuit 28, which outputs a delayed pulse on the $\overline{R/W}$ signal line 100. In response to the delayed pulse, the 22-bit instruction code on the higher place 22 bits of the bus 106 is written to the instruction RAM 10. The delayed pulse on the $\overline{R/W}$ signal line 100 is also inputted to another delay circuit 30, which outputs a further delayed pulse as the clear signal to the instruction buffer 14, so that the BUSY signal 116 is reset. Thus, the WRQ instruction and the WOK instruction as mentioned above can be written to the instruction RAM 10 in the above mentioned procedures. On the other hand, an external system can know, from the status of the BUSY signal 116, whether or not a next instruction code or an address can be transferred.

The instruction RAM 10 can be written with an instruction for writing a coefficient data to the coefficient RAM 18, and with an instruction for setting an address to an address counter 32, which is coupled to the coefficient RAM 18 so as to designate an address of the coefficient RAM 18 through an address bus 124. The coefficient RAM 18 has a capacity of 16 bits × 128 words. A coefficient data is transferred from the instruction RAM 10 to the coefficient RAM 18 by using 16 bits of the 22-bit bus 102. On the other hand, when the instruction decoder 20 decodes a portion of an instruction code including a coefficient data, the instruction decoder 20 outputs a high level pulse signal through a $\overline{R/W}$ signal line 126 to the coefficient RAM 18. In addition, a 7-bit address for the coefficient RAM 18 is transferred to the address counter 32 as a portion of the instruction code by using 7 bits of the bus 102. In addition, when the instruction decoder 20 decodes a portion of an instruction code including a coefficient RAM address, the instruction decoder 20 outputs an address counter write signal 126 to the address counter 32. When the $\overline{R/W}$ signal 126 is at a low level, a 16-bit coefficient data is outputted to a 16-bit bus 130 from an address of the coefficient RAM 18 designated by the address counter 32.

On the other hand, the program counter 12 is incremented in response to a rising edge of a pulse on a line 132. Therefore, a period of the pulse on the line 132 defines an instruction cycle for an instruction stored in the instruction RAM 10. The line 132 is connected to an output of an AND gate 34, whose one input is connected through an inverter 36 to the external WOK signal line 120. Another input of the AND gate 34 is connected to receive a clock signal of for example 8 MHz in this embodiment.

A content of the program counter 12 is reset to zero in response to a rising edge of a pulse on an internal reset signal line 134, which is connected to an output of another AND gate 38. This AND gate 38 has a first input connected to the output of the inverter 36 and a second input connected to receive an external reset signal 136 from a pulse generator 40. In this embodiment, the pulse generator 40 generates a clock signal of for example 44.1 KHz. Thus, when the external WOK signal 120 is at the low level, the internal reset signal 134 is the same as the external reset signal 136. Accordingly, the external reset signal 236 functions to externally define a period in which an instruction program stored in the instruction RAM 10 is executed.

When the external WOK signal 120 is at the high level, namely, in the mode in which an instruction code is forcibly written to the instruction RAM 10, since both of the AND gates 34 and 38 are put in a closed condition, the content of the program counter 12 is neither incremented nor reset to zero. In addition, when the external WOK signal 120 is at the high level, all outputs of the instruction decoder 20 are masked.

Here, it should be note that the instructions stored in the instruction RAM 10 includes, in addition to the WOK instruction and the WRQ instruction as mentioned above, an instruction inhibiting the updating of the program counter 12 under a predetermined condition (this instruction will be called "HALT" instruction hereinafter).

When the instruction decoder 20 decodes the HALT instruction, the decoder 20 generates a pulse signal on a HALT signal line 138. On the other hand, when the instruction decoder 20 decodes the WRQ instruction, the decoder 20 generates a signal on a WRQ decode signal line 140. The WRQ decode signal line 140 is connected to a reset input R of an set-reset flipflop 42, whose set input S is connected to an output of an AND gate 44. A first input of the AND gate 44 is connected to receive the $\overline{R/W}$ signal 100 from the delay circuit 28, and a second input of the AND gate 44 is connected to receive the WRQ detection signal 112 from the decoder 16. The flipflop 44 has a $\overline{Q}$ output connected to one input of an AND gate 46, whose other input is connected to receive the HALT signal 138 from the instruction decoder 20. An output of the AND gate 46 is connected to a first input of a three-input OR gate 48. This OR gate 48 has a second input connected to receive the WRQ decode signal 140 from the instruction decoder 20, and a third input connected to receive the WOK detection signal 118 also from the instruction decoder 20. An output of the OR gate 48 is connected to a set input S of another set-reset flipflop 50, which in turn has a reset input R connected to receive the internal RESET signal 134. A Q output of the flipflop 50 is supplied to the program counter 12 as a HALT indication signal 142.

Thus, when either the WOK instruction or the WRQ instruction is decoded, a pulse signal is applied to the set input S of the flipflop 50 so that the HALT indication signal 142 generated at the Q output of the flipflop 50 is brought to a high level. When the HALT indication signal 142 is at the high level, the program counter 12 is never incremented in response to the increment pulse 132. On the other hand, since the flipflop 50 is reset by the internal RESET signal 134, the HALT indication signal 142 is brought to a low level by the internal RESET signal 134.

At the timing where the WRQ instruction is written to the instruction RAM 10, the set-reset flipflop 42 is set. This flipflop 42 is reset by the WRQ decode signal 140. When the flipflop 42 is in the reset condition (namely, when the $\overline{Q}$ output of the flipflop 42 is at the high level), if the HALT instruction is decoded, the flipflop 50 is set by the HALT signal 128 through the AND gate 46 and the OR gate 48. As a result, the updating operation of the program counter 12 is temporarily stopped. Thereafter, when the internal reset signal 134 is brought to the high level, the HALT indication signal 142 is correspondingly brought to the low level, and at the same time, the content of the program counter 12 is cleared to zero. However, if the flipflop 42 is in the set condition (namely, when the $\overline{Q}$ output of the flipflop 42 is at the low level), even if the HALT instruction is decoded, since the flipflop 50 is never set, the updating operation of the program counter 12 will not stop. Namely, the program counter 12 will be incremented in response to each increment pulse, so that instructions stored at addresses of the instruction RAM 10 following the address when the HALT instruction is stored will be sequentially read out and decoded by the instruction decoder 20.

The following Table 1 shows the various instructions mentioned above.

TABLE 1

| MNEMONIC | FUNCTION |
| --- | --- |
| WOK | allow to write an instruction code to the instruction RAM 10 |
| HALT | inhibit the updating of the program counter 12 |
| WC | write the coefficient data to the coefficient RAM 18 |
| WCA | write the address information to the address counter 32 |
| NOP | idling for one instruction cycle without executing any processing |
| WRQ | change the content of the coefficient RAM 18 (when the WRQ instruction is decoded, the pulse signal is outputted to the WRQ decode signal line 140) |

Now, an operation of the first embodiment will be described.

Figure 2:
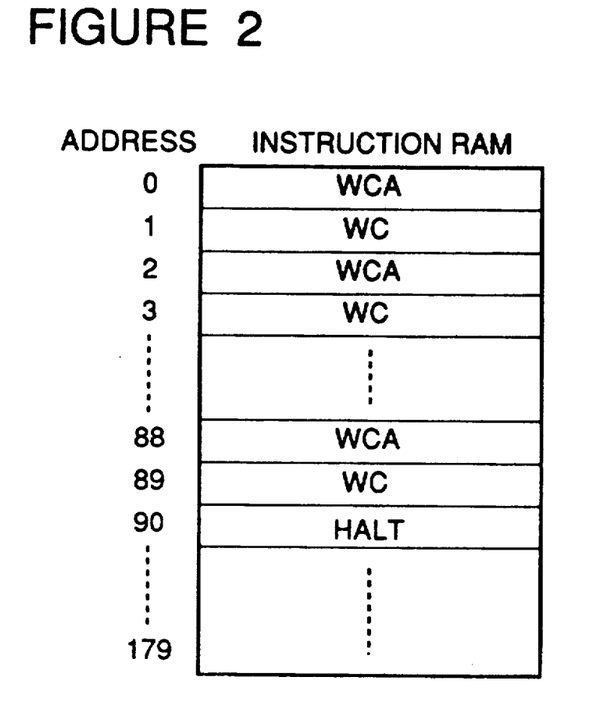
FIGS. 2, 3 and 4 illustrate examples of programs stored in the instruction RAM used in the microcomputer shown in FIG. 1.

First, under a condition in which the external WOK signal 120 is maintained at the high level, a set of instructions including a plurality of WCA instructions for setting an address to the address counter 32 and a plurality of WC instructions for transferring a coefficient data to the coefficient RAM 18 are written to the instruction RAM 10 through the serial data line 108, while incrementing the program counter 12. In addition, the HALT instruction is written to the instruction RAM 10. In the course of writing these instructions, the output of the instruction decoder 20 assumes the same value as the decoded result of an NOP instruction. FIG. 2 shows the content of the instruction RAM 10 after the above mentioned writing operation has been completed.

Thereafter, the external WOK signal 120 is brought to the low level. When the pulse signal is outputted on the external reset line 136, the program counter 12 is cleared to zero, and thereafter, will be incremented in response to each increment pulse 132, so that the instructions stored in the instruction RAM 10 are sequentially executed in the order of the address number form the address number "0". As a result, a set of coefficient data is set to the coefficient RAM 18. Then, the HALT instruction is executed. At this time, since the Q̄ output of the flipflop 42 has already brought to the high level, the flipflop 50 is set, so that the content of the program counter 12 is no longer updated or incremented. In other words, instructions stored after the HALT instruction in the instruction RAM 10 will be not executed.

Figure 3:
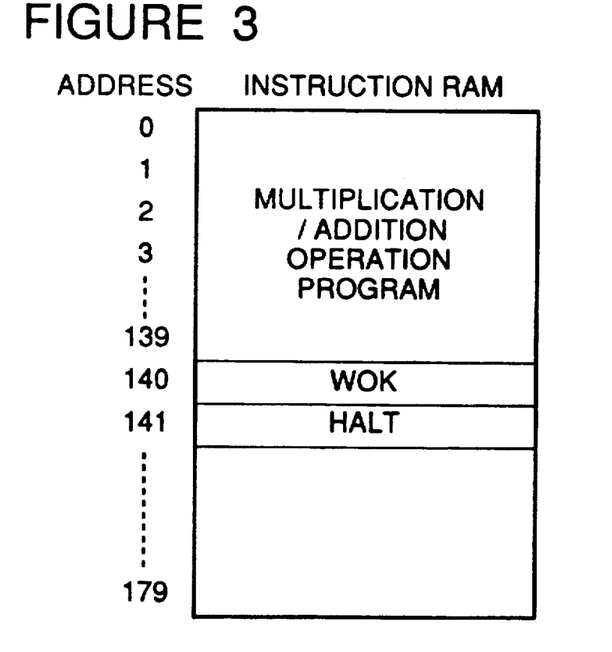

Here, the external WOK signal 120 is brought to the high level, again, and a multiplication/addition operation program for the filtering processing is written through the serial data line 108 to the instruction RAM 10, and furthermore, the WOK instruction and the HALT instruction are written to the instruction RAM 10. FIG. 3 shows the content of the instruction RAM 10 after the above mentioned writing operation has been completed.

Then, the external WOK signal is brought to the low level, so that the external reset signal 136 of 44.1 KHz is inputted through the AND gate 38 to the program counter 12. Namely, the program shown in FIG. 3 repeatedly executed with a period of 22.7 μs (=1/44.1 KHz). Since the increment clock is 8 MHz, the time required for executing the program in each period is 17.5 μs (={⅛ MHz}×140 steps=0.125 μs×140 steps). Accordingly, if the HALT instruction at an address number "141" is executed at once in each period, since the increment of the program counter 12 is inhibited, the HALT instruction is repeatedly executed until a next period is started in response to a next external reset signal 136 applied from the pulse generator 40. In this embodiment, the HALT instruction is repeatedly executed for a time period of 5.2 μs (=22.7−17.5).

When the multiplication/addition operation program shown in FIG. 3 is repeatedly executed with the period of 22.7 μs, the WCA instructions and the WC instructions and the WRQ instruction are written through the serial data line 108 to memory locations of the instruction RAM 10 succeeding the address storing the HALT instruction. In addition, these instructions are executed for rewriting or changing the content of the coefficient RAM 18. This rewriting operation will be explained below.

In the course of the execution of the program shown in FIG. 3 under the low level external WOK signal 120, the WOK instruction is transferred through the serial data line 108. When a destination address of the instruction RAM 10 and an instruction code of the WOK instruction are completed in the instruction buffer 14, the BUSY signal 116 is brought to the high level. Therefore, when the WOK instruction of the address number "140" is executed, the WOK detection signal 118 is brought to the high level, so that the WCK instruction is written to the instruction RAM 10. In this case, the WCA instruction supplied through the serial data line 108 is previously set to have the destination address of the address number "142".

The flipflop 50 is maintained in the set condition after the WOK detection signal 118 is brought to the high level until the external reset signal 136 is applied from the pulse generator 40, and therefore, the output of the instruction decoder 20 dose not change in the course of writing the WCA instruction to the instruction RAM 10.

Figure 4:
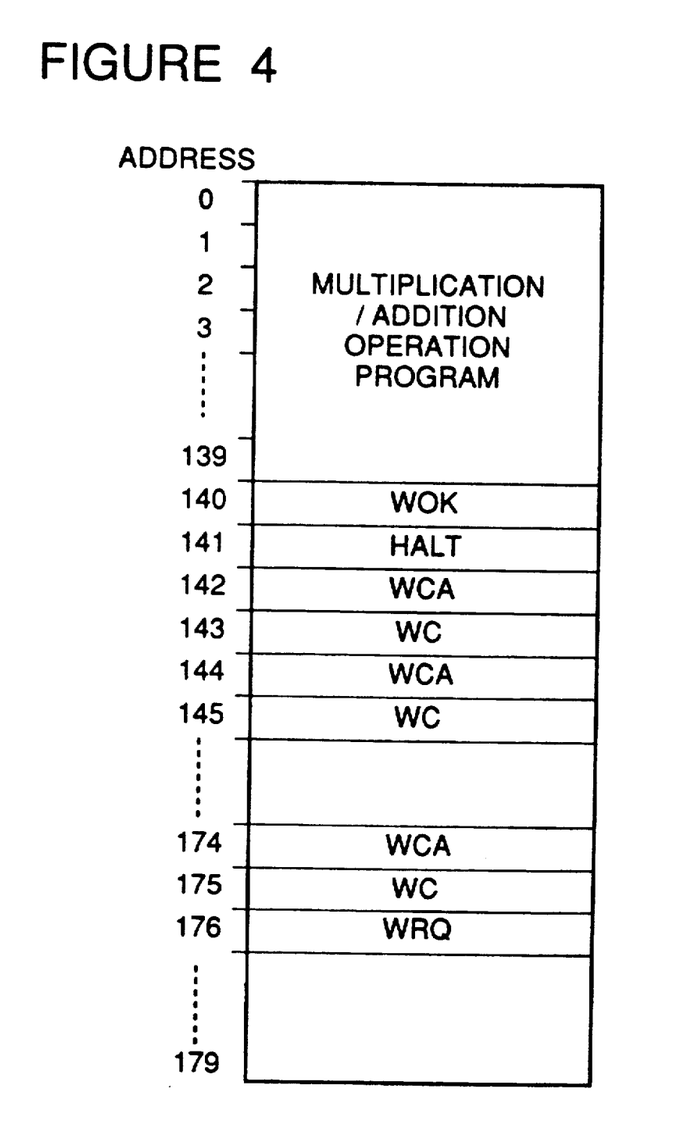

Similarly, the WC instruction, the WCA instruction, the WC instruction, . . . , and the WRQ instruction are written to the instruction RAM 10. FIG. 4 shows the content of the instruction RAM 10 after completion of the above mention writing operation of the WC instruction, the WCA instruction, the WC instruction, . . . , and the WRQ instruction.

When the WRQ instruction is written to the instruction RAM 10, the flipflop 42 is set so that the Q̄ output of the flipflop 42 is brought to the low level. In this condition, if the external reset signal 136 is applied from the pulse generator 40, the instructions stored in the instruction RAM 10 are sequentially executed in the order of the address number from the address number"0". However, the HLAT signal genrated when the HALT instruction of the address number "141" is decoded, is masked or blocked, since the AND gate 46 is in the closed condition by the low level Q̄ output of the flipflop 42. Accordingly, the flipflop 50 is not set, the WCA instructions and WC instructions stored at the address number "142" and the succeeding addresses are executed. Namely, the instructions at the address numbers "142" to "175" are executed so that coefficients corresponding to 17 words in the coefficient RAM 18 is rewritten or changed. Thereafter, the WRQ instruction of the address number "176" is decoded, the WRQ decode signal 140 is brought to the high level to reset the flipflop 42 so as to cause the flipflop to have the high level Q̄ output. At the same time, the flipflop 50 is set by the high level WRQ decode signal 140, so that the increment of the program counter 12 is inhibited.

As seen from the above descrioption, the first embodiment can rewrite or change the content of the coefficient RAM in an interval between continuous multiplication/addition program execution times, without discontinuing or stopping the multiplication/addition operation processing for the filtering. In addition, it is not necessary for a coefficient RAM to have a capacity larger than the number of coefficient words referred to in the multiplicaiton/addition operation processing.

In general, in the multiplicaiton/addition operation processing for realizing the filtering operation for the audio signal processing, a plurality of coefficients are used for each one filter. Therefore, when the characteristics of the filter is modified or changed, it is necessary to change or modify the plurality of required coefficients in a moment. Otherwise, an unintentional transient filter would be formed. In the above mentioned embodiment, since a plurality of coefficients are rewritten or changed after the completion of the multiplicaiton/addition operation processing for one period but before execution of the multiplication/addition operation processing for a next period, the unintenional transient filter will never be formed.

In the above mentioned embodiment, it would be apparent to persons skilled in the art that the capacity of the RAMs, the width of the buses, and the size of the registers can be freely selected.

Figure 5:
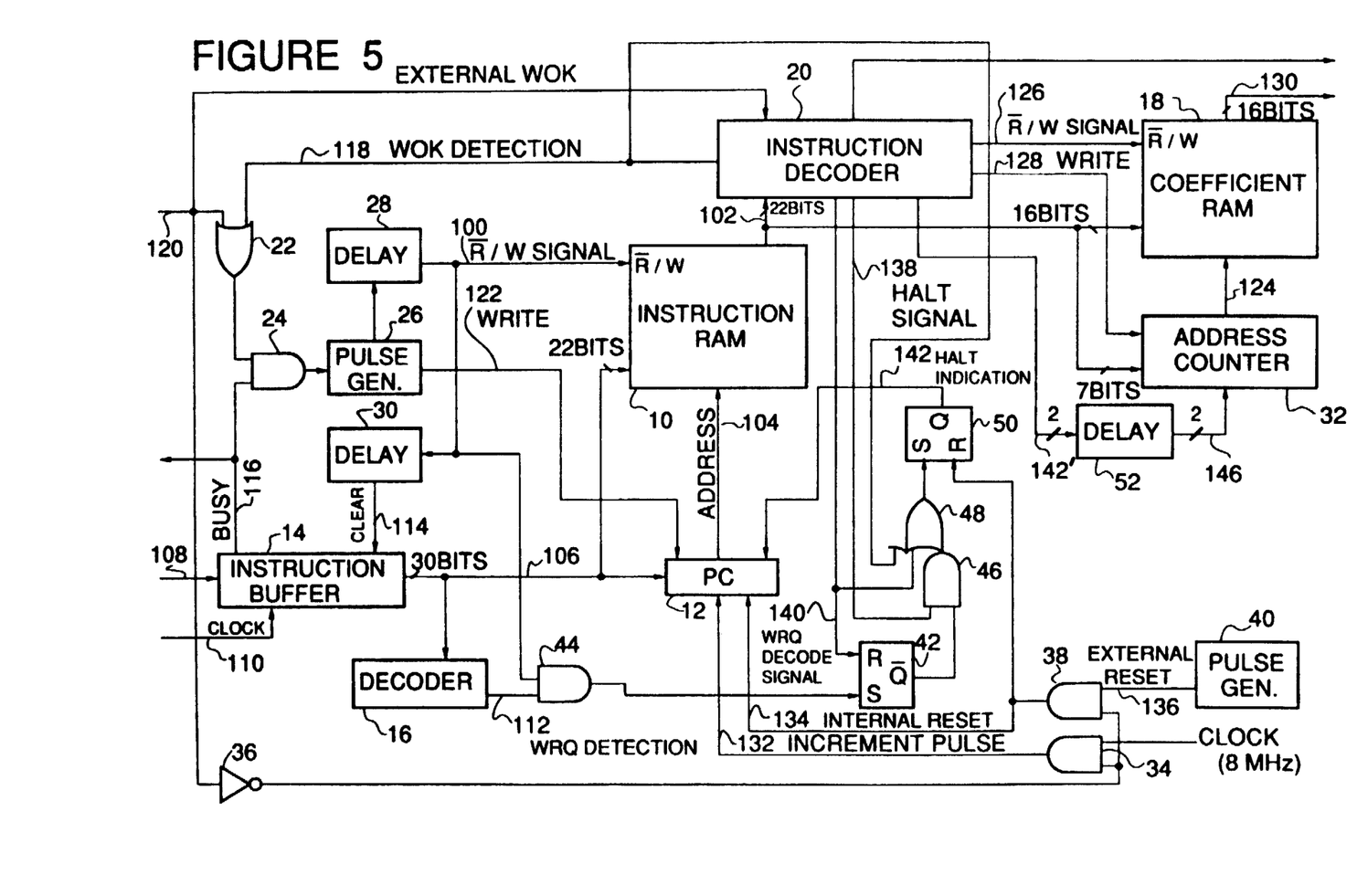
FIG. 5 is a block diagram of another embodiment of the microcomputer in accordance with the present invention.

Referring to FIG. 5, there is shown a block diagram of a modification of the microcomputer shown in FIG. 1. In FIG. 5, therefore, elements similar to those shown in FIG. 1 are given the same Reference Numerals, and explanation thereof will be omitted for simplification of the description.

As seen from comparison between FIGS. 1 and 5, the microcomputer shown in FIG. 5, the instruction decoder 6 outputs a two-bit signal 142 to a delay circuit 52, which outputs a delayed two-bit signal 146 for instructing an increment/decrement to the address counter 32. When WCINC instruction explained hereinafter is decoded by the instruction decoder 20, the decoder 20 generates the two-bit signal 142 having a content {1,0}. In addition, when a WCDEC instruction explained hereinafter is decoded by the instruction decoder 20, the decoder 20 generates the two-bit signal 142 having a content of {0,1}. The two-bit signal 142 is delayed by the delay circuit 52, and the signal 146 outputted from the delay circuit 52 is rendered effective before a next instruction cycle is started. When the delayed two-bit signal 146 is {1,0}, the content of the address counter 32 is incremented by +1. On the other hand, when the delayed two-bit signal 146 is {0,1}, the content of the address counter 32 is incremented by −1, namely is decremented by 1.

Thus, the embodiment shown in FIG. 5 can executes not only the instructions shown in the Table 1, but also instructions shown in the following Table 2.

TABLE 2

| MNEMONIC | FUNCTION |
|---|---|
| WCINC | write the coefficient data to the coefficient RAM 18 shown in FIG. 5, and thereafter, increment the content of the address counter 124 by +1 before the next instruction cycle is started. |
| WCDEC | write the coefficient data to the coefficient RAM 18 shown in FIG. 5, and thereafter, decrement the content of the address counter 124 by 1 before the next instruction cycle is started. |

Figure 6:
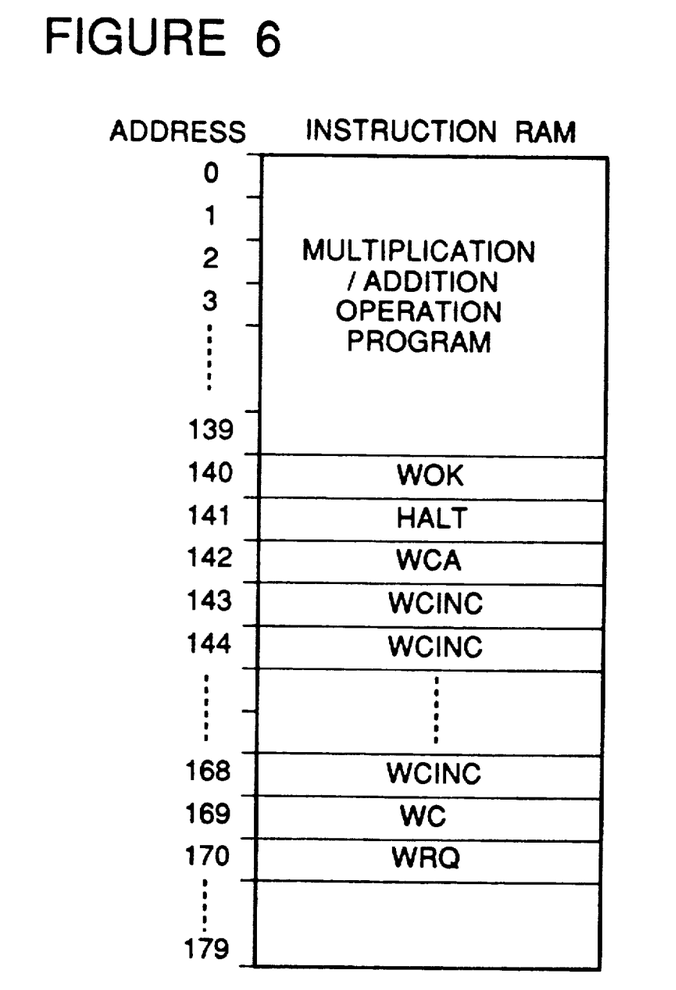
FIG. 6 illustrates an example of a program stored in the instruction RAM used in the microcomputer shown in FIG. 5.

Turning to FIG. 6, there is shown one example of a program for rewriting or changing the content of the coefficient RAM 18 in an interval between continuous multiplication/addition program execution times, without discontinuing or stopping the multiplication/addition opertion processing for the filtering. In the program shown in FIG. 6, 27 words of coefficient data can be rewritten or changed by the instructions stored at the addrss numbers "143" to "169".

The embodiment shown in FIG. 6 is advantageous over the first embodiment shown in FIG. 1, in that the embodiment shown in FIG. 6 allows to write, in the same empty area of the instruction RAM 10 (excluding the area storing the multiplication/addition operation program), a program which can rewrite or change the coefficient data twice as much as that attained in the first embodiment shown in FIG. 1.

As seen from the above description of the embodiment with reference to the accompanying drawings, the microcomputer in accordance with the present invention can rewrite or change the content of the coefficient RAM, without discontinuing or stopping the multiplicaiton/addition operation processing for the filtering which is executed at every constant interval, and by using a coefficient RAM having only a capacity equal to the number of coefficient words referred to in the multiplication/addition operation processing.

In addition, since a plurality of coefficients are rewritten or changed after the completion of the multiplication/addition operation processing for one period but before execution of the multiplication/addition operation processing for a next period, it is possible to prevent the formation of the unintenitonal transient filter in the audio signal processing. Furthermore, since it is not necessary to transfer a rewriting or changing coefficient data within on the periodical time in which the multiplication/addition operation processing is executed, a load of a host system can greatly decreased.

Accordingly, it is possible to modify the characteristics of the filter without discontinuing or stopping the multiplication/addition operation processing for the filtering which is executed at every constant interval, on the one handk and by using a coefficient RAM having no redundancy exceeding the number of coefficient words referred to in the multiplication/addition operation processing, on the other hand. Therefore, whem the system is assembled on a LSI chip, it is possible to prevent the increase of the chip area. In other words, it is possible to decrease the cost of the system and to increase the manufacturing yield.

The invention has thus been shown and described with reference to the specific embodiments. However, it should be noted that the present invention is in no way limited to the details of the illustrated structures but changes and modifications may be made within the scope of the appended claims

I claim:

1. A microcomputer comprising an instruction buffer receiving an instruction a first decoder coupled to the instruction buffer for decoding the instruction outputted from instruction buffer so as to generate a write request detection signal, an instruction memory coupled to the instruction buffer for receiving and storing the instruction ouptutted from instruction buffer, a program counter coupled to the instruction memory for indicating an address to be writtten or read, the program counter being also coupled to the instruction buffer for receiving an address information from the instruction buffer and being incremented in response to an increment pulse, a second instruction decoder coupled to the instruction memory for receiving an instruction code read from the instruction memory and for generating data and control signals including a halt signal and a write request decode signal, a data memory coupled to the second instruction deocder for storing the data from the second instruction decoder in response to a write signal from the second instruction decoder and for outputting data stored in the data memory in response to a read signal from the second instruction decoder, an address counter coupled to the second instruction decoder for receiving an address information from the second instruction decoder, a first set-reset circuit having a set input connected to receive through a gate the write request decode signal from the second instruction decoder and the halt signal from the second instruction decoder and for generating a halt indication signal to the program counter so as to inhibit an updating of the program counter, a second set-reset circuit having a set input connected to receive the write request detection signal form the first instruction decoder and a reset input connected to receive the write request decode signal from the second instruction decoder, the second set-reset circuit having an output connected to the gate so as to prevent the halt signal from being inputted through the gate to the first set-reset circuit when the second set-reset circuit is in a set condition, and a pulse input circuit for receiving a clock pulse for defining a periodical operation and for outputting the clock pulse to the program counter and the first set-reset circuit as a reset signal.

2. A microcomputer comprises an instruction buffer receiving an instruction, a first decoder for decoding the instruction outputted from instruction buffer so as to generate a write request detection signal, an instruction memory for receiving and storing the instruction outputted from instruction buffer, a program counter for indicating an address to be written or read, a second instruction decoder for receiving an instruction code read from the instruction memory and for generating data and control signals including a halt signal, a data memory for storing the data from the second instruction decoder in response to a write signal from the second instruction decoder and for outputting data stored in the data memory in response to a read signal from the second instruction decoder, an address counter for receiving an address information from the second instruction decoder and for supplying an address to the data memory, a logic circuit connected to receive through a gate the halt signal from the second instruction decoder and for generationg a halt indication signal to the program counter so as to inhibit an updating of the program counter, the logic circuit being also connected to receive the write request detection signal from the first instruction decoder and the write request decode signal from the second instruction decoder so that the halt signal is prevented from being inputted through the gate when the write request detection signal and the write request decode signal are in a predetermined condition, and a pulse input circuit for receiving a clock pulse for defining a periodical operation and for outputting the clock pulse to the program counter.

* * * * *